United States Patent
Yang et al.

(10) Patent No.: US 9,838,748 B2
(45) Date of Patent: Dec. 5, 2017

(54) TRANSMITTING APPARATUS AND RECEIVING APPARATUS, AND SIGNAL PROCESSING METHOD THEREOF

(71) Applicant: SAMSUNG ELECTRONICS CO., LTD., Suwon-si (KR)

(72) Inventors: Hyun-koo Yang, Seoul (KR); Sung-hee Hwang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 295 days.

(21) Appl. No.: 14/273,630

(22) Filed: May 9, 2014

(65) Prior Publication Data

US 2015/0010018 A1  Jan. 8, 2015

Related U.S. Application Data

(60) Provisional application No. 61/875,246, filed on Sep. 9, 2013, provisional application No. 61/843,115, filed (Continued)

(30) Foreign Application Priority Data

Sep. 27, 2013  (KR) .................. 10-2013-0115741

(51) Int. Cl.
*H04N 21/61* (2011.01)
*H04N 21/2383* (2011.01)
(Continued)

(52) U.S. Cl.
CPC ......... *H04N 21/6112* (2013.01); *H04H 20/72* (2013.01); *H04N 21/2383* (2013.01); *H04N 5/00* (2013.01); *H04N 21/40* (2013.01)

(58) Field of Classification Search
None
See application file for complete search history.

(56) References Cited

U.S. PATENT DOCUMENTS

2011/0164703 A1* 7/2011 Yokokawa ............. H04H 40/18
    375/316
2012/0243600 A1  9/2012 Jeong et al.
(Continued)

FOREIGN PATENT DOCUMENTS

EP    2268004 A2    12/2010
EP    2302848 A1    3/2011
(Continued)

OTHER PUBLICATIONS

Correia S. et al., "DVB-T2 modulator design supporting multiple PLP and auxiliary streams", 2010 IEEE International Symposium on, Mar. 24-26, 2010 (http://ieeexplore.ieee.org/search/searchresult.jsp?newsearch=true&queryTe=t=11363474&x=69&y=18), total 8 pages.

(Continued)

*Primary Examiner* — Kibrom T Hailu
(74) *Attorney, Agent, or Firm* — Sughrue Mion, PLLC

(57) ABSTRACT

A transmitting apparatus includes a frame generator configured to map data included in an input stream to at least one signal processing path to generate a frame, an information inserter configured to insert signaling information to a signaling region of the frame, and a transmitter configured to transmit the frame with the signaling information inserted therein. The signaling information including input stream synchronizer (ISSY) mode information, receiver buffer size information required according to the ISSY mode information, and time information representing a time between a P1 symbol of a preset frame for transmitting a user packet and an output of a preset bit of a first user packet of the user packet.

11 Claims, 30 Drawing Sheets

Related U.S. Application Data on Jul. 5, 2013, provisional application No. 61/843,095, filed on Jul. 5, 2013.

(51) Int. Cl.
    *H04H 20/72*     (2008.01)
    *H04N 5/00*     (2011.01)
    *H04N 21/40*     (2011.01)

(56) References Cited

U.S. PATENT DOCUMENTS

| | | | | |
|---|---|---|---|---|
| 2012/0307159 A1* | 12/2012 | Ouchi | ............... | H04L 5/0007 348/723 |
| 2012/0327955 A1* | 12/2012 | Herrmann | ............ | H04N 21/235 370/476 |
| 2013/0114423 A1* | 5/2013 | Nicolas | ............ | H04L 29/06027 370/252 |
| 2013/0195089 A1* | 8/2013 | Tandra | ................ | H04W 16/14 370/338 |
| 2013/0329775 A1* | 12/2013 | Yokokawa | .......... | H04L 25/0232 375/229 |
| 2014/0003540 A1* | 1/2014 | Okada | .............. | H04N 21/44004 375/240.25 |

FOREIGN PATENT DOCUMENTS

| | | |
|---|---|---|
| KR | 10-2010-0130560 A | 12/2010 |
| KR | 10-2012-0108920 A | 10/2012 |
| WO | 2011/105093 A2 | 9/2011 |

OTHER PUBLICATIONS

International Search Report for PCT/KR2014/006017 dated Oct. 23, 2014 [PCT/ISA/210].
Written Opinion for PCT/KR2014/006017 dated Oct. 23, 2014 [PCT/ISA/237].

\* cited by examiner

FIG. 5A

```
for i = 0..NUM_PLP-1{
        ...
        PLP_ISSY_mode(2bits)
        ...
}
```

FIG. 5B

```
for i = 0..NUM_PLP-1{
        ...
        PLP_ISSYI(1bits)
        ...
}
```

FIG. 5C

```
for i = 0..NUM_PLP-1{
        ...
        TTO(32bits)
        BUFS(12bits)
        ISSY_Interval(10bits)
        ...
}
```

FIG. 6A

```
• In configurable L1-post
        for i = 0..NUM_PLP-1 {
            ...
            PLP_ISSY                                    (1 bits)
            ...
        }

• In dynamic L1-post
        for i = 0..NUM_PLP-1 {
            ...
            TTO                                         (32 bits)
            BUFS                                        (12 bits)
            ...
        }
```

FIG. 6B

```
● In L1-post
        for i = 0..NUM_PLP-1 {
                ...
                PLP_ISSYI                       (1 bits)
                TTO                             (32 bits)
                BUFS                            (12 bits)
                ...
        }
```

FIG. 6C

```
• In configurable L1-post
        for i = 0..NUM_PLP-1 {
                ...
                PLP_ISSYI_mode                          (2 bits)
                ...
• In dynamic L1-post
        for i = 0..NUM_PLP-1 {
                ...
                IF (PLP_ISSYI_mode != 00) {
                        TTO                             (32 bits)
                    BUFS                                (12 bits)
                }
                IF (PLP_ISSYI_mode == 10) {
                        ISCR_Interval                   (10 bits)
                        IF (ISCR_Interval == 1023D) {
                                ISCR_IF                 (24 bits)
                        }
                }
                ...
```

FIG. 6D

```
• In configurable L1-post
        for i = 0..NUM_PLP-1 {
                ...
                PLP_ISSYI_mode                          (1 bits)
                ...
• In dynamic L1-post
        for i = 0..NUM_PLP-1 {
                ...
                IF (PLP_ISSYI_mode = 1) {
                        TTO                             (32 bits)
                        BUFS                            (12 bits)
                        ISCR_Interval                   (10 bits)
                        IF (ISCR_Interval == 1023D) {
                        ISCR_IF                         (24 bits)
                        }
                }
                ...
```

FIG. 6E

```
• In configurable L1-post
        for i = 0..NUM_PLP-1 {
                ...
                PLP_ISSYI_mode                          (1 bits)
                ...
• In dynamic L1-post
        for i = 0..NUM_PLP-1 {
                ...
                TTO                                     (32 bits)
                BUFS                                    (12 bits)
                ISCR_Interval                           (10 bits)
                ...
```

FIG. 6F

```
• In configurable L1-post
       for i = 0..NUM_PLP-1 {
           ...
           PLP_ISSYI_mode                (2 bits)
           ...
• In dynamic L1-post
       for i = 0..NUM_PLP-1 {
           ...
           TTO                           (32 bits)
           BUFS                          (12 bits)
           ISCR_Interval                 (10 bits)
           ...
```

FIG. 12E

```
• In configurable L1-post
        for i = 0..NUM_PLP-1 {
                ...
                PLP_ISSY_IND                            (1 bits)
                ...
        }
• In dynamic L1-post
        for i = 0..NUM_PLP-1 {
                ...
                if (PLP_ISSY_IND = = '1'){
                        PLP_TTO                         (32 bits)
                        PLP_BUFS                        (10 bits)
                }
                ...
        }
```

FIG. 12F

```
• In configurable L1-post
        for i = 0..NUM_PLP-1 {
                ...
                PLP_ISSY_IND                            (1 bits)
                ...
        }
• In dynamic L1-post
        for i = 0..NUM_PLP-1 {
                ...
                if (PLP_ISSY_IND = = '1'){
                        PLP_BUFS_UNIT                   (2 bits)
                        PLP_BUFS                        (8 bits)
                        PLP_TTO                         (32 bits)
                }
                ...
        }
```

TRANSMITTING APPARATUS AND RECEIVING APPARATUS, AND SIGNAL PROCESSING METHOD THEREOF

CROSS-REFERENCE TO RELATED APPLICATIONS

This application claims priority from U.S. Provisional Patent Application Nos. 61/843,095, 61/843,115 and 61/875,246, filed on Jul. 5, 2013, filed on Jul. 5, 2013, and filed on Sep. 9, 2013, in the United States Patent and Trademark Office, and Korean Patent Application No. 10-2013-0115741, filed on Sep. 27, 2013, in the Korean Intellectual Property Office, the disclosures of which are incorporated herein by reference in their entirety.

BACKGROUND

1. Field

Apparatuses and methods consistent with the present disclosure relate to a transmitting apparatus and a receiving apparatus, and a signal processing method thereof, and more particularly, to a transmitting apparatus and a receiving apparatus, and a signal processing method thereof, for mapping data to at least one signal processing path and for transmitting the data.

2. Description of the Related Art

Recently, multi-functional and wideband high quality broadcast communication devices have been developed. In particular, by virtue of electronic technologies, portable broadcast devices such as high quality digital televisions (TVs), high specification smart phones, and the like have become popular. Accordingly, there is desire to use various reception methods and to support various services with regard to broadcast services.

Along with this desire, broadcast communication standards such as, for example, Digital Video Broadcasting the Second Generation Terrestrial (DVB-T2) have been developed. DVB-T2 is the second generation EU terrestrial digital broadcast standard obtained by improving the performance of Digital Video Broadcasting-Terrestrial (DVB-T), which is a standard that has been adopted by 35 or more countries around the world including the EU. DVB-T2 applies recent technologies such as low density parity check (LDPC) coding, 256QAM modulation, and so on, thereby increasing transmission efficiency and bandwidth efficiency. Accordingly, DVB-T2 is advantageous for providing various high quality services such as High-Definition TV (HDTV) to a limited band HDTV.

DVB-T2 adds and transmits information to a header region of a transmission frame. The added information is for compensating for a variable delay caused by data processing at a transmitter. Accordingly, problems arise in that a receiver needs to process a data frame in order to use the corresponding information.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a transmitting apparatus, a receiving apparatus, and a controlling method thereof, for adding information to signaling information in order to compensate for a variable delay caused by data processing at a transmitter and for transmitting the added information.

According to an aspect of the present disclosure, a transmitting apparatus includes a frame generator configured to map data included in an input stream to at least one signal processing path to generate a frame, an information inserter configured to insert signaling information to a signaling region of the frame, and a transmitter configured to transmit the frame with the signaling information inserted therein, wherein the signaling information includes input stream synchronizer (ISSY) mode information, receiver buffer size information required according to the ISSY mode information, and time information representing a time between a P1 symbol of a preset frame for transmitting a user packet and an output of a preset bit of a first user packet of the user packet.

Here, the preset frame may be a first frame to which an interleaving frame for transmitting the user packet is mapped.

The signaling region may include a configurable field and a dynamic field, the configurable field may include the ISSY mode information, the dynamic field may include the receiver buffer size information and time information.

The dynamic field may further include input stream clock reference (ISCR) information.

In addition, the signaling information may include pre-signaling information and post-signaling information, and the configurable field and the dynamic field may be included in the post-signaling information.

A digital video broadcasting second generation terrestrial (DVB-T2) transmitting system may include the transmitting apparatus, and the signaling region of the frame may be a region for transmitting L1 signaling.

A digital video broadcasting second generation terrestrial (DVB-T2) transmitting system may include the transmitting apparatus, and the receiver buffer size may be a buffer size (BUFS) and the time information is time to output (TTO).

According to another aspect of the present disclosure, a receiving apparatus includes a receiver configured to receive a frame including signaling information and data mapped to at least one signal processing path, a signaling processor configured to extract the signaling information from the received frame, and a signal processor configured to signal-process the data included in the frame based on the extracted signaling information, wherein the signal processor signal-processes the data based on input stream synchronizer (ISSY) mode information, receiver buffer size information required according to the ISSY mode information, and time information representing a time between a P1 symbol of a preset frame for transmitting a user packet and an output of a preset bit of a first user packet of the user packet. The signaling information includes the ISSY mode information, the receiver buffer size information, and the time information.

Here, the preset frame may be a first frame to which an interleaving frame for transmitting the user packet is mapped The signaling region may include a configurable field and a dynamic field, the configurable field may include the ISSY mode information, and the dynamic field may include the receiver buffer size information and time information.

The dynamic field may further include input stream clock reference (ISCR) information.

The signaling information may include pre-signaling information and post-signaling information, and the configurable field and the dynamic field may be included in the post-signaling information.

In addition, a digital video broadcasting second generation terrestrial (DVB-T2) receiving system may include the receiving apparatus, and the signaling region of the frame may be a region for transmitting L1 signaling.

In addition, a digital video broadcasting second generation terrestrial (DVB-T2) receiving system may include the receiving apparatus, and the receiver buffer size may be a buffer size (BUFS) and the time information is time to output (TTO).

According to another aspect of the present disclosure, a signal processing method of a transmitting apparatus includes mapping data included in an input stream to at least one signal processing path to generate a frame, inserting signaling information to a signaling region of the frame; a transmitting the frame with the signaling information inserted therein, wherein the signaling information includes input stream synchronizer (ISSY) mode information, receiver buffer size information required according to the ISSY mode information, and time information representing a time between a P1 symbol of a preset frame for transmitting a user packet and an output of a preset bit of a first user packet of the user packet.

Here, the preset frame may be a first frame to which an interleaving frame for transmitting the user packet is mapped.

The signaling region may include a configurable field and a dynamic field, the configurable field may include the ISSY mode information, and the dynamic field may include the receiver buffer size information and time information between a P1 symbol of a preset frame for transmitting a user packet and time when a preset bit of a first user packet of a user packet is output.

In addition, the dynamic field may further include input stream clock reference (ISCR) information.

In addition, the signaling information may include pre-signaling information and post-signaling information, and the configurable field and the dynamic field may be included in the post-signaling information.

According to another aspect of the present disclosure, a signal processing method of a receiving apparatus includes receiving a frame including signaling information and data mapped to at least one signal processing path, extracting the signaling information from the received frame; and signal-processing the data included in the frame based on the extracted signaling information, wherein the signal-processing includes signal-processing the data based on input stream synchronizer (ISSY) mode information, receiver buffer size information required according to the ISSY mode information, and time information representing a time between between a P1 symbol of a preset frame for transmitting a user packet and an output of a preset bit of a first user packet of the user packet. The signaling information including the ISSY mode information, the receiver buffer size information, and the time information.

According to another aspect of the present disclosure, a broadcast signal receiving apparatus includes a broadcast signal receiver configured to receive a broadcast signal and a processor system. The broadcast signal includes signaling information for compensating for a variable delay caused by data processing before the broadcast signal receiving apparatus receives broadcast signal, and data mapped to at least one signal processing path. The processor system is configured to process the data, and to compensate for the variable delay by using the signaling information included in the broadcast signal.

Here, the signaling information may include input stream synchronizer (ISSY) mode information, receiver buffer size information required according to the ISSY mode information, and time information representing a time between a P1 symbol of a preset frame for transmitting a user packet and an output of a preset bit of a first user packet of the user packet.

In addition, the broadcast signal may include a frame that includes the signaling information and the data.

As described above, according to the various exemplary embodiments of the present disclosure, information for compensating for variable delay caused via data processing at a transmitter may be acquired from signaling information, thereby improving stream processing performance of a receiver.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which:

FIGS. 5A to 5C are diagram for explanation of an input stream synchronizer (ISSY) mode according to various exemplary embodiments of the present disclosure;

FIGS. 6A to 6F are diagram for explanation of configuration of a singling file according to various exemplary embodiments of the present disclosure;

FIGS. 12A to 12F are diagrams for explanation of a system configuration and a configuration of a signaling field, according to an exemplary embodiment of the present disclosure;

DETAILED DESCRIPTION OF THE EXEMPLARY EMBODIMENTS

Certain exemplary embodiments of the present disclosure will now be described in greater detail with reference to the accompanying drawings. In the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Figure 1:
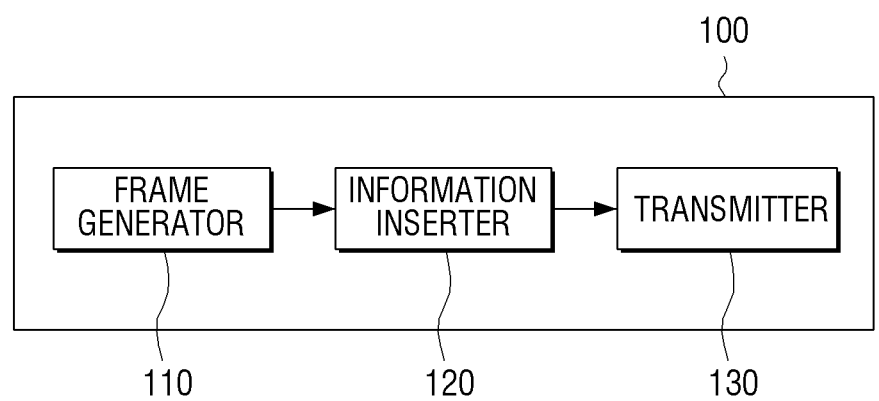
FIG. 1 is a block diagram illustrating a structure of a transmitting apparatus according to an exemplary embodiment of the present disclosure.

FIG. 1 is a block diagram illustrating a structure of a transmitting apparatus 100 according to an exemplary embodiment of the present disclosure. Referring to FIG. 1, the transmitting apparatus 100 includes a frame generator 110, an information inserter 120, and a transmitter 130.

The frame generator 110 maps data contained in an input stream to at least one signal processing path to generate a frame. According to an exemplary embodiment of the present disclosure, a digital video broadcasting the second generation terrestrial (DVB-T2) system applies a Physical Layer Pipe (PLP) concept so as to provide various broadcast services with different modulation schemes, different channel code rates, different time and interleaving lengths, etc., to one broadcast channel.

Here, PLP refers to a signal path that is independently processed. That is, respective services (e.g., video, expanding video, audio, data stream, and so on) may be transmitted via a plurality of Radio Frequency (RF) channels. In this regard, PLP is a path for transmitting such a service or a stream including data transmitted through the path. In addition, PLP may be located in slots that are distributed at a time interval on a plurality of RF channels or may be distributed at a time interval on one RF channel. That is, one PLP may be distributed and transmitted at a time interval on one RF channel or a plurality of RF channels.

PLP has input mode 'A' for providing one PLP and input mode 'B' for providing a plurality of PLPs. In particular, when input mode 'B' is supported, PLP may provide a specific robust service and may also distribute and transmit one stream, thereby increasing a time interleaving length to obtain time diversity gain. In addition, when PLP receives only a specific stream, a receiver may be powered off for remaining periods of time so as to use PLP at low power. Thus, PLP is appropriate for providing a portable and mobile broadcast service.

Here, time diversity refers to technology for acquiring excellent transmission quality by synthesizing received signals by a receiving side when a transmitting side transmits the same signal several times at a predetermined time interval for reducing degradation in transmission quality in a mobile communication transmission path.

In addition, information to be commonly transmitted via a plurality of PLPs may be added to one PLP and transmitted, thereby increasing transmission efficiency. This PLP is referred to as a common PLP. Other PLPs except for PLP0 may be used to transmit data. Such a PLP is referred to as data PLP.

That is, the frame generator 110 maps data contained in the input data to at least one signal processing path to generate a frame and performs signal processing on a path by path basis. For example, the signal processing may include at least one from among input stream synchronization, delay compensation, null packet deletion, CRC encoding, header insertion, coding, interleaving, and modulation. Frames signal-processed per path are generated as one transmission frame together with signaling information. In addition, the generated transmission frame is transmitted to a receiving apparatus.

The information inserter 120 inserts the signaling information into a singling region of the frame.

Here, the signaling information may be a Layer 1 (L1) signaling signal for transmitting an L1 signal for frame synchronization. The signaling information may include a configurable field and a dynamic field. The signaling region may be a P2 symbol for frame synchronization. The signaling region may be added to a start portion of the frame to generate a transmission signal. According to an exemplary embodiment of the present disclosure, in the DVB-T2 system, one unit of a transmission frame to which a P1 symbol and a signaling region are added is referred to as a T2 frame.

The P2 symbol may be divided into a pre-signaling information region and a post-signaling information region. In addition, the post-signaling information region may include a configurable field and a dynamic field.

The P1 and P2 symbols are terms used in the example of DVB-T2. The P1 symbol indicates a start of a frame and the P2 symbol includes the signaling region. According to another exemplary embodiment of the present disclosure, the start of a frame may be indicated using one preamble symbol including the singling region.

According to the present exemplary embodiment, the singling information inserted into the signaling region may include input stream synchronizer (ISSY) mode information, receiver BUFfer Size information (BUFS) required according to the ISSY mode information, and time information (hereinafter, referred to as Time-To-Output (TTO)). The TTO is the time between the P1 symbol (or a symbol indicating start of a frame such as a preamble) of a preset frame for transmitting a user packet and the output of a preset bit of a first user packet of a user packet is output. Here, the preset frame may be a first frame to which an interleaving frame for transmitting a user packet is mapped and the preset bit may be a most significant bit (MSB) of the interleaving frame. That is to say, in some exemplary embodiments, the TTO is the time between the start of the first T2-frame of the interleaving frame and the output of the first bit of the interleaving frame. The P1 and P2 symbols are terms used in the example of DVB-T2. The P1 symbol indicates start of a frame and the P2 symbol includes the signaling region. According to another exemplary embodiment of the present disclosure, start of a frame may be indicated using one preamble symbol including the singling region. Here, an accurate definition of a TTO may vary according to configuration of a start symbol of a frame and a definition of a user packet, which will be described with regard to the following exemplary embodiments of the present disclosure.

The ISSY mode information may be used to compensate for the variable delay caused by data processing at a transmitter. When the ISSY mode information is used, a receiver may regenerate accurate timing for restoring an output stream. A variable for the ISSY mode information may be, for example, the aforementioned BUFS, TTO, and input stream clock reference (ISCR). Here, the ISCR refers to synch timing information generated in consideration of all delay caused during a transmission process with a channel so as to restore a service at original timing during service restoration.

The ISCR information may be included in at least one of an L1 packet and an L2 packet. According to an ISSY mode, the signaling information may further include ISCR interval information. Here, the ISCR interval information is required for an ISSY mode in which an ISCR value is transmitted to a portion of the L1 packet and indicates an interval of L1 packets in which an ISSY field is present.

The ISSY mode information may be included in a configurable field of L1 signaling and the BUFS and TTO may be included in a dynamic field of the L1 signaling.

In addition, the dynamic field may further include input stream clock reference (ISCR) interval information.

The aforementioned ISSY, BUFS, time to output (TTO), and ISCR are described in detail in "Digital Video Broadcasting (DVB); Frame structure channel coding and modulation for a second generation digital terrestrial television broadcasting system (DVB-T2), ETSI EN 302 755 V1.1.1 (2009-09)" incorporated herein by reference, and thus, are not described in detail here.

The transmitter 130 transmits a frame to which signaling information is inserted. The transmitting apparatus 100 may transmit service data together with signaling information including location and size information of data to a transmitting apparatus (not shown).

Figure 2:
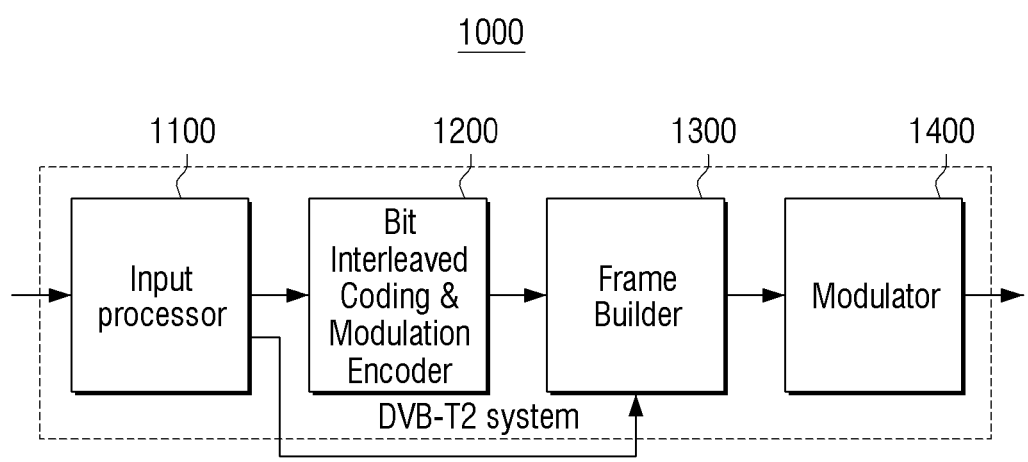
FIG. 2 is block diagram for explanation of configuration of a digital terrestrial television broadcasting system (DVB-T2) of a transmitter.

FIG. 2 is block diagram for explanation of a configuration of a DVB-T2 transmitting apparatus according to an exemplary embodiment of the present disclosure.

Referring to FIG. 2, a DVB-T2 transmitting apparatus 1000 may include an input processor 1100, a bit interleaved coding & modulation (BICM) encoder 1200, a frame builder 1300, and a modulator 1400.

The components of the DVB-T2 transmitting apparatus 1000 will be described briefly. With regard to the detailed descriptions of the components of the DVB-T2 transmitting apparatus 1000, refer to "Digital Video Broadcasting (DVB); Frame structure channel coding and modulation for a second generation digital terrestrial television broadcasting system (DVB-T2)".

The input processor 1100 generates a baseband frame (BBFRAME) from an input stream of service target data. Here, the input stream may be an MPEG-2 transport stream, a generic stream (GS), or the like.

The input processor 1100 may include the aforementioned ISSY module that may generate the aforementioned ISSY variables. An example of the ISCR among the ISSY variables may be a counter value when a first bit (or byte) of a specific user packet is input to the input processor 1100. The counter operates at a frequency that is known to a transmitter and a receiver.

The BICM encoder 1200 determines an FEC coding rate and a constellation order according to a region (a fixed PHY frame or a mobile PHY frame) to which service target data is to be transmitted and performs coding. In some exemplary embodiments of the present disclosure, signaling information about the service target data may be encoded by a separate BICM encoder (another) or encoded by sharing the BICM encoder 1200.

The frame builder 1300 and the modulator 1400 determine an OFDM parameter for a signaling region and an OFDM parameter for a region to which the service target data is to be transmitted in order to configure a frame, and add a synch region to the configured frame to generate the frame. In addition, the generated frame is modulated into a radio frequency (RF) signal and the RF signal is transmitted to a receiver.

The frame generation described with reference to FIG. 1 may be performed by the input processor 1100 and the information insertion may be performed by the frame builder 1300.

Figure 3:
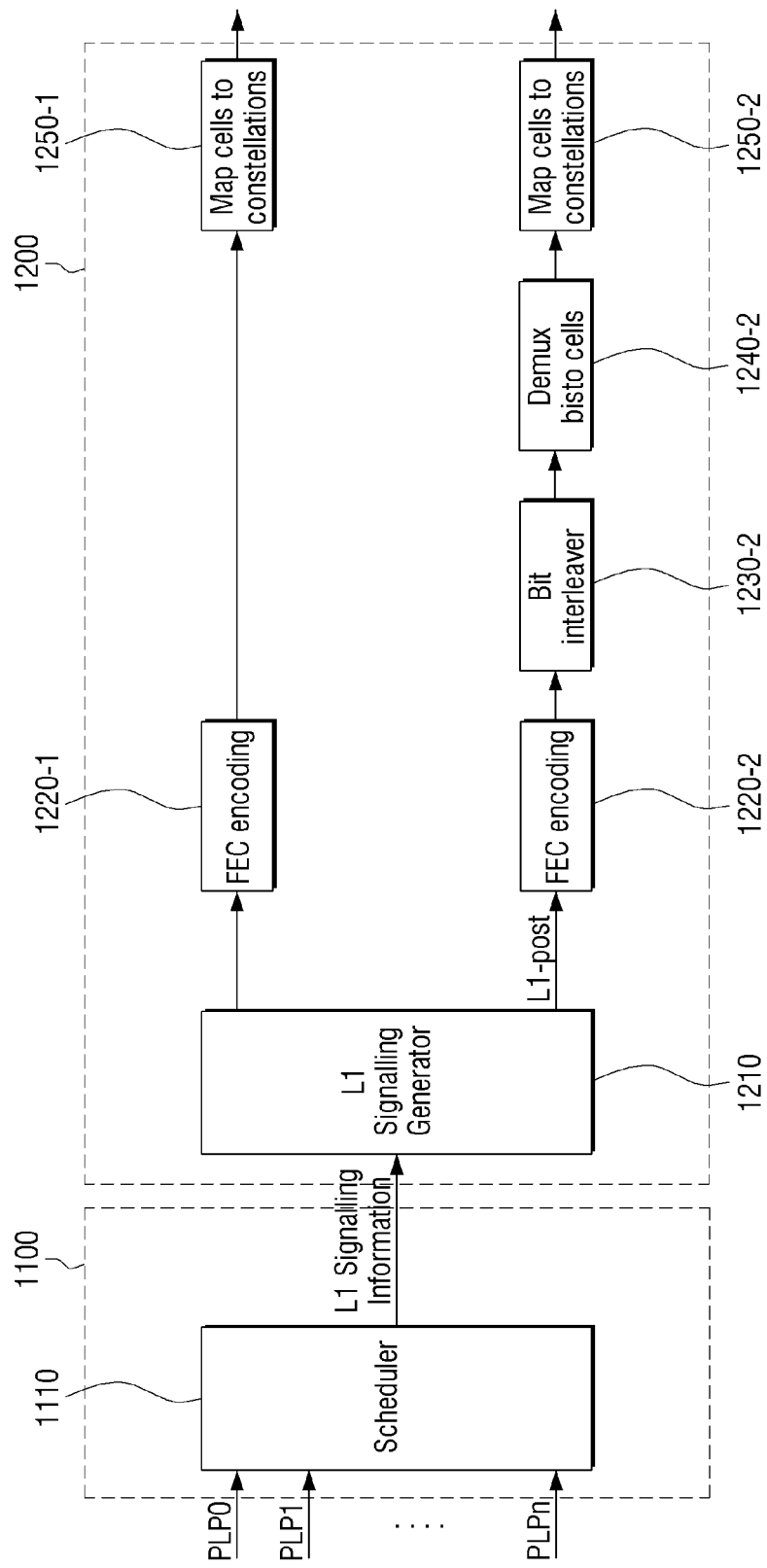
FIG. 3 is a block diagram for explanation of components for generating signaling information according to an exemplary embodiment of the present disclosure.

FIG. 3 is a block diagram for explanation of components for generating signaling information according to an exemplary embodiment of the present disclosure.

FIG. 3 illustrates the input processor 1100 and the BICM encoder 1200. The input processor 1100 may include a scheduler 1110. The BICM encoder 1200 may include an L1 signaling generator 1210, FEC encoders 1220-1 and 1220-2, a bit interleaver 1230-2, a demux 1240-2, and constellation mappers 1250-1 and 1250-2. The BICM encoder 1200 may further include a time interleaver (not shown). In addition, the L1 signaling generator 1210 may be included in the input processor 1100.

Respectively, n pieces of service data are mapped to PLP0 to PLPn. The scheduler 1110 determines a location, modulation, and a code rate per PLP in order to map plural PLPs to a physical layer of T2. That is, the scheduler 1110 generates L1 signaling information. As necessary, the scheduler 1110 may output dynamic field information of L1-post-signaling information of a current frame to the frame builder 1300. In addition, the scheduler 1110 may transmit the L1 signaling information to the BICM encoder 1200. The L1 signaling information includes L1-pre-signaling information and L1-post-signaling information.

The L1 signaling generator 1210 separately outputs the L1-pre-signaling information and the L1-post-signaling information. The FEC encoders 1220-1 and 1220-2 perform FEC encoding including shortening and puncturing. The bit interleaver 1230-2 performs interleaving on the encoded L1 post-signaling information on a bit basis. The demux 1240-2 adjusts an order of bits included in a cell to control the cell's robustness and outputs the cell including bits. The two the constellation mappers 1250-1 and 1250-2 map cells of the L1-pre-signaling information and the L1-post-signaling information to constellations. The L1-pre-signaling information and the L1-post-signaling information are processed via the aforementioned process are output to the frame builder 1300. Thus, the L1-pre-signaling information and the L1-post-signaling information may be inserted into a frame.

FIGS. 4A to 4D are diagrams for explanation of a structure of a unit of a transmission frame according to an exemplary embodiment of the present disclosure.

Figure 4A:
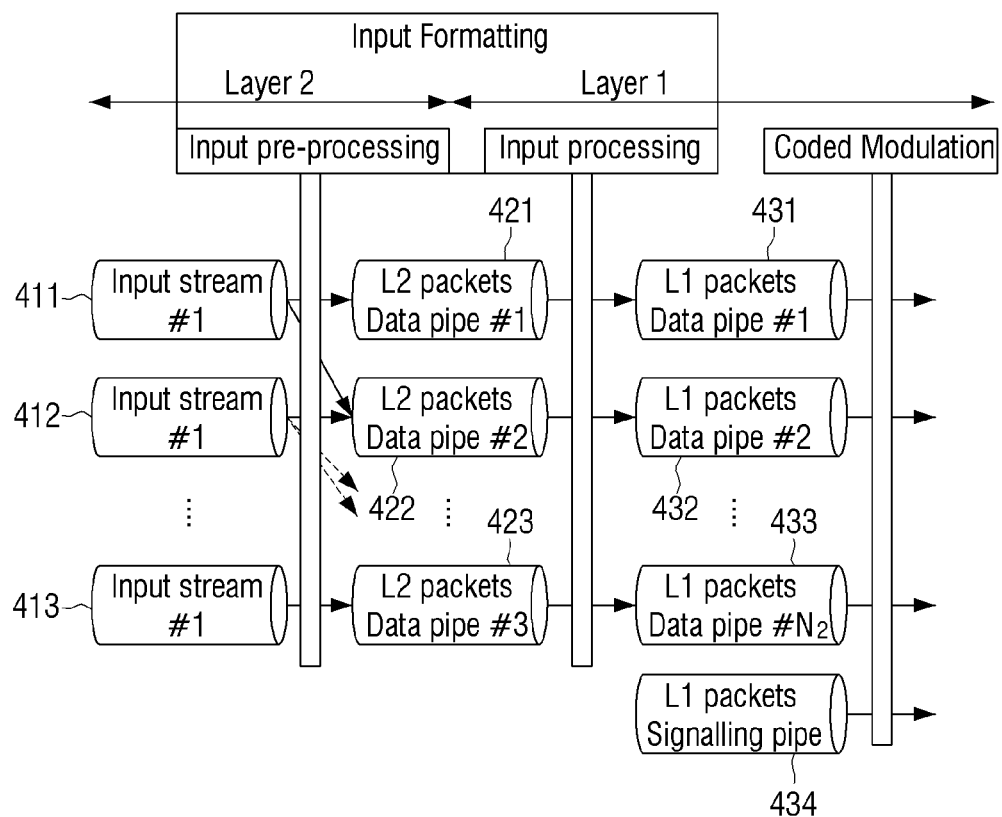
FIGS. 4A to 4D are diagrams for explanation of a structure of a unit of a transmission frame according to an exemplary embodiment of the present disclosure.

As illustrated in FIG. 4A, an input processing module for processing an input stream to an L1 packet may operate at a data pipe level.

FIG. 4A illustrates a process of processing the input stream to the L1 packet. A plurality of input streams 411 to 413 are processed to data pipes 421 to 423 of a plurality of L2 packets via an input pre-processing procedure. The data pipes 421 to 423 of the plural L2 packets are encapsulated to data pipes 431 to 433 of the plural L1 packets and scheduled to a transmission frame via an input processing procedure. Here, an L2 packet may be of two types of fixed streams such as a transport stream (TS) and a variable stream such as a general stream encapsulation (GSE) stream.

Figure 4B:
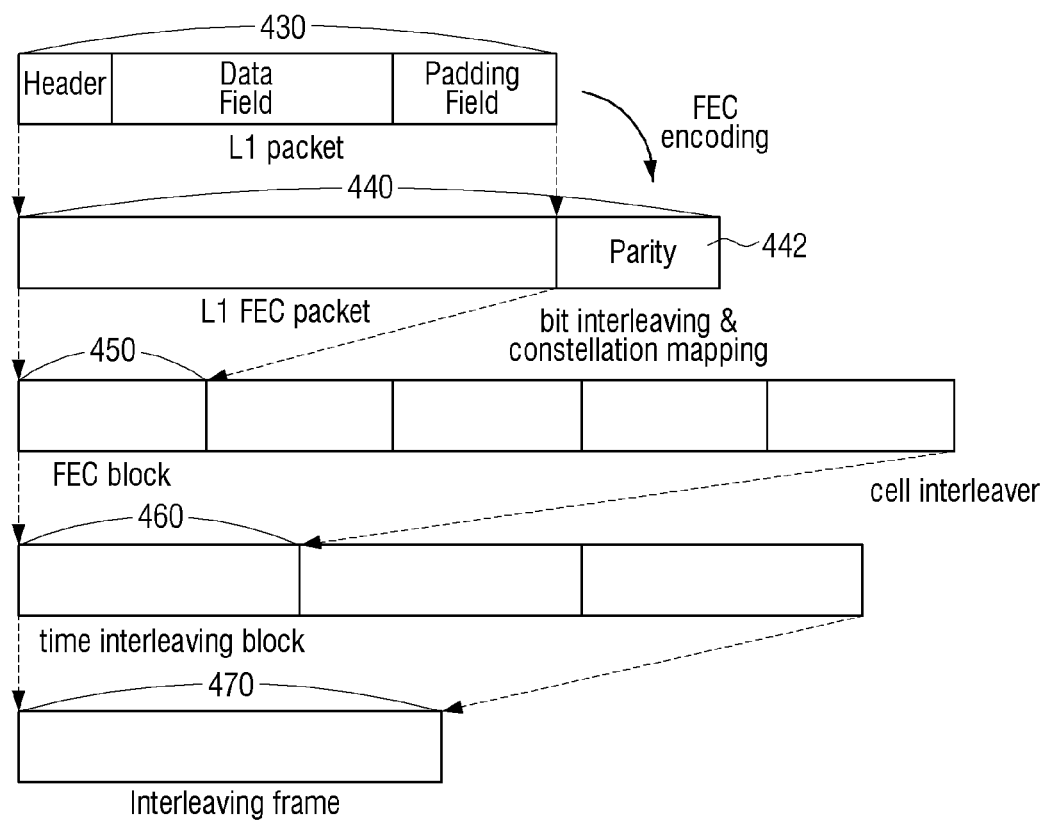

FIG. 4B is a diagram for explanation of a structure of a local frame of each PLP.

As illustrated in FIG. 4B, an L1 packet 430 includes a header, a data field, and a padding field.

Parity 442 is added to the L1 packet 430 and then the L1 packet 430 is processed to an L1 FEC packet 440 via an FEC ending procedure.

The L1 FEC packet 440 may be processed to an FEC block 450 via a bit interleaving and constellation mapping procedure, and a plurality of FEC blocks are processed to a time interleaving block 460 via a cell interleaving procedure, and a plurality of time interleaving blocks are included in an interleaving frame 470.

Figure 4C:
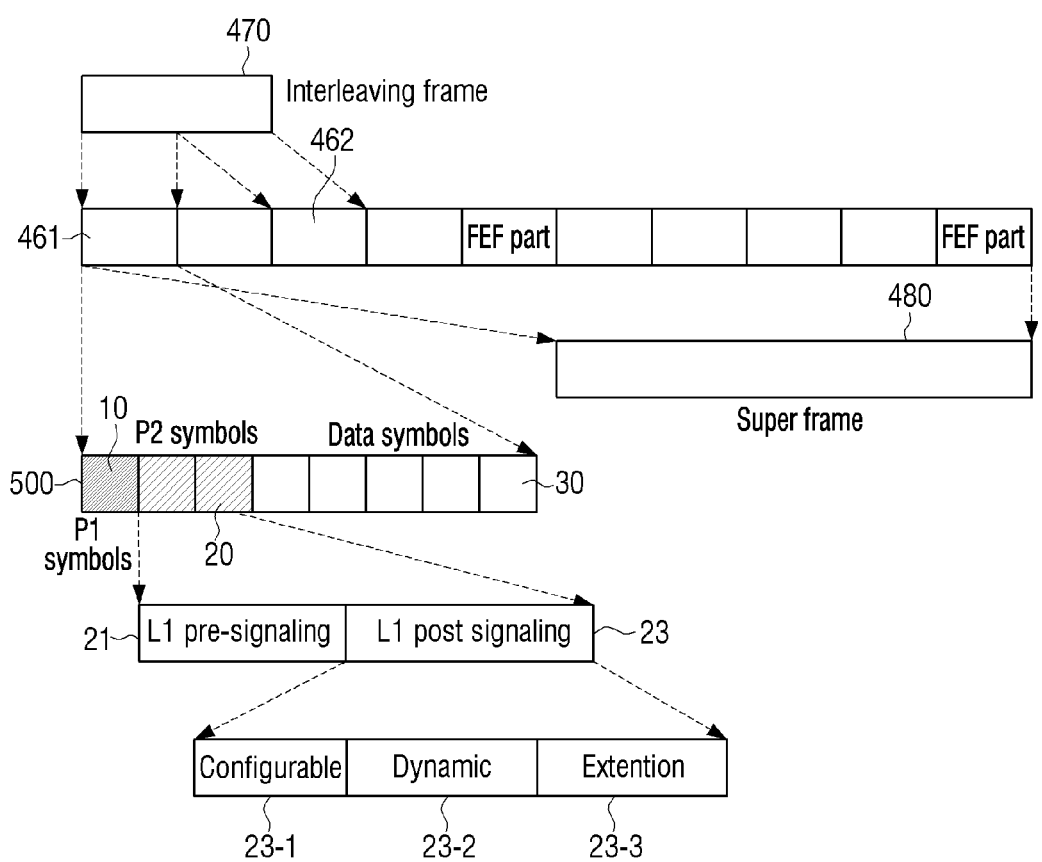

FIG. 4C is a diagram for explanation of a structure of an interleaving frame 470.

Referring to FIG. 4C, the interleaving frame 470 may be transmitted through different transmission frames 461 and 462 and a plurality of transmission frames may form one super frame 480.

One transmission frame 461 may include P1 symbols 10 indicating a start position of the frame, P2 symbols 20 for transmitting an L1 signal, and data symbols 30 for transmitting data.

The P1 symbols 10 may be located at a first portion of the transmission frame 461 and used to detect a start point of the transmission frame 461. For example, the P1 symbols 10 may transmit 7-bit information.

The P2 symbols 20 is located subsequent to the P1 symbols 10 of the transmission frame 461. One transmission frame 461 may include a plurality of P2 symbols 20 according to an FFT size. The number of the P2 symbols 20 included according to an FFT is shown in Table 1 below.

TABLE 1

| FFT Size | Number of P2 Symbols |
|---|---|
| 1K | 16 |
| 2K | 4 |
| 4K | |
| 8K | 2 |
| 16K | 1 |
| 32K | 1 |

The P2 symbols 20 include L1 pre-signaling information 21 and L1 post-signaling information 23. The L1 pre-signaling information 21 provides a basic transmission parameter including parameters required to receive and decode the L1 post-signaling information 23.

The L1 post-signaling information 23 includes a configurable field 23-1 and a dynamic field 23-2. In addition, the L1 post-signaling information 23 may optionally include an extension field 23-3. Although not illustrated, the L1 post-signaling information 23 may further include a CRC field and an L1 padding field as necessary.

Figure 4D:
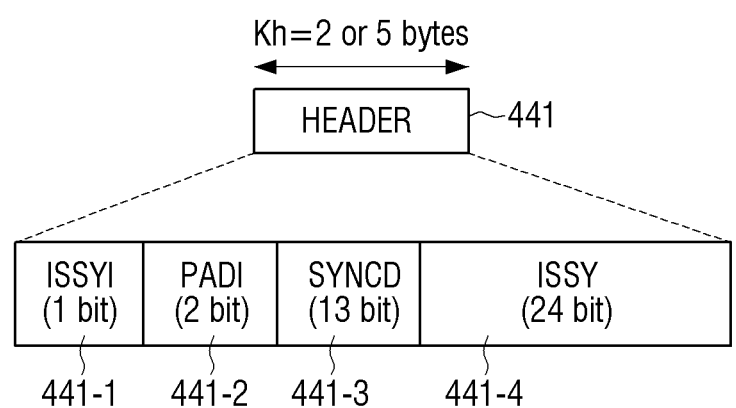

FIG. 4D illustrates a structure of a header 441 of an L1 packet 440.

As illustrated in FIG. 4D, the header 441 of the L1 packet 440 includes an ISSYI field 441-1, a PADI field 441-2, a SYNCD field 441-3, and an ISSY field 441-4.

The ISSYI field 441-1 is a 1-bit field indicating whether an ISSY field 441-4 is present. As shown in Table 2 below, when the ISSYI field 441-1 is set to 0, the ISSY field 441-4 is not present. When the ISSYI field 441-1 is set to 1, the ISSY field 441-4 for signaling ISCR information is present.

TABLE 2

| 0 | No ISSY field |
|---|---|
| 1 | There is ISSY field to signal ISCR information |

The PADI field 441-2 is a 2-bit field and indicates a state of a padding sub region as shown in Table 3 below.

TABLE 3

| 00 | No Padding |
|---|---|
| 01 | 1 byte Padding (No PADL field) |
| 10 | Padding equal or more than 2 bytes (2 bytes PADL field) |
| 11 | Reserved |

The SYNCD field 441-3 is a 13-bit field and indicates a byte distance to start of a first L1 packet.

The ISSY field 441-4 is a 24-bit field and indicates an ISCR value of the first L1 packet. The ISSY field 441-4 may have a value when the ISSYI field 441-1 is set to 1.

Figure 5A:
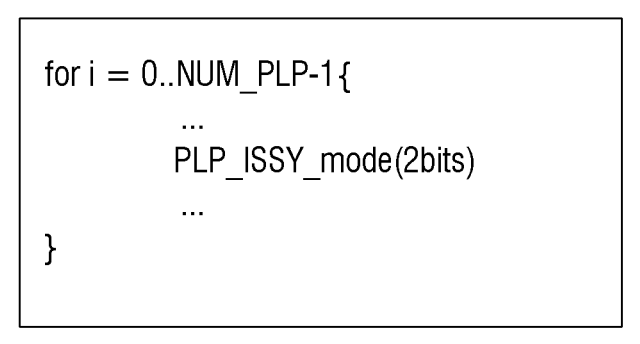
Figure 5B:
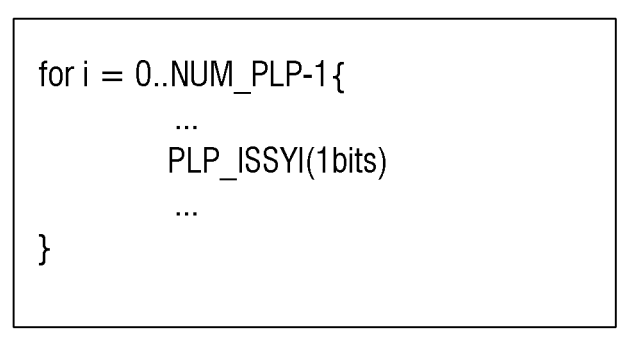

FIGS. 5A and 5B are diagram for explanation of an ISSY mode according to various exemplary embodiments of the present disclosure.

According to an exemplary embodiment of the present disclosure, the ISSY mode, that is, a PLP_ISSY_mode is an input symbol synchronization mode of a PLP. ISSY mode information may be included in the configurable field 23-1 of the L1-post-signaling field 23.

For example, the PLP_ISSY_mode may be configured in 2 bits as illustrated in FIG. 5A and may have values shown in Table 4 below.

TABLE 4

| 00 | ISSY is not used. |
|---|---|
| 01 | Reserved |
| 10 | the ISCR value is carried as part of particular L1 packet |
| 11 | the ISCR value is appended to each L2 packet |

As another example, PLP_ISSYI may be configured in 1 bit as illustrated in FIG. 5B and may have values shown in Table 5 below.

TABLE 5

| 0 | No ISSY field |
|---|---|
| 1 | There is ISSY field to signal ISCR information |

However, the present disclosure is not limited thereto. When PLP_ISSYI is configured in 1 bit, if the PLP_ISSYI field is set to 1, then the TTO and BUFS values are provided to a dynamic field 23-2 and an ISCR value is provided from an ISSY field 441-4 (refer to FIG. 4D) of an L2 packet, and if the PLP_ISSYI field is set to 0, then the ISSY field 441-4 is not used. For example, when PLP does not transmit a stream or transmits a stream for compensating for delay and jitter at a higher layer than a physical layer, the corresponding field may be set to 0, which will be described below with reference to the drawings.

FIG. 5C is a diagram for explanation of TTO, BUFS, and ISCR_Interval information according to an exemplary embodiment of the present disclosure.

For example, the TTO is configured in 32 bits, the BUFS is configured in 12 bits, and the ISCR_Interval is configured in 10 bits. Here, the ISCR_Interval has a specific value only when the PLP_ISSY_mode is "10". When the corresponding field is set to 0, whether the ISSY field 441-4 is present is determined according to ISSYI of a header region. When the corresponding field is set to a value other than 0, the ISCR_Interval indicates an interval between L1 packets in which the ISSY field 441-4 is present in the header region and is started from a first L1 packet of an interleaving frame 470. For example, when the corresponding field is set to 0, the ISSY field 441-4 is present in a first L1 packet, an 11$^{th}$ L1 packet, a 21$^{st}$ L1 packet, etc., of the interleaving frame 470.

The ISSYI field 441-1 (refer to FIG. 4D) present in the header region is a 1-bit field indicating whether the ISSY field 441-4 is present. When the ISSYI field 441-1 is set to 1, then it indicates that the ISSY field 441-4 for signaling ISCR information is present.

Here, the TTO, the BUFS, and the ISCR_Interval have been described above, and thus, will not be described any more.

FIGS. 6A to 6F are diagram for explanation of configuration of a singling file according to various exemplary embodiments of the present disclosure.

As illustrated in FIG. 6A, a configuration field of the signaling field according to an exemplary embodiment of the present disclosure may include a PLP_ISSYI field (1 bit) and a dynamic field 23-2 of the signaling field may include a TTO field (32 bits) and a BUFS field (12 bits).

Here, a PLP_ISSYI field (1 bit) may indicate whether a value of an ISSY mechanism is present and in detail, may have the following values shown in Table 6 below.

TABLE 6

| | |
|---|---|
| 1 | TTO and BUFS values shall be provided in the PLP loop of the dynamic L1-post-signaling and ISCR value shall be provided in the ISSY field of a L2 packet carrying TS packets |
| 0 | ISSY use is not activated |

That is, when the PLP_ISSYI field is set to 1, this value indicates that TTO and BUFS values are provided to the dynamic field 23-2 and an ISCR value is provided from the ISSY field 441-4 (refer to FIG. 4D) of the L2 packet. In addition, when the PLP_ISSYI field is set to 0, this value indicates that ISSY is not activated. When PLP does not transmit any stream, the corresponding field may be set to 0.

The TTO field (32 bits) indicates a TTO value of a first L2 packet started in a data sub region of a first L1 packet of an interleaving frame 470 including a transmission frame. When the PLP_ISSYI field is set to 0, the corresponding ISSYI field 441-1 may be set to 0.

The BUFS field (12 bits) indicates a buffer size of a receiver assumed by a modulator with respect to PLP. When ISSY is not used, that is, when the PLP_ISSYI field is set to 0, the corresponding ISSYI field 441-1 may be set to 0.

As illustrated in FIG. 6B, according to another exemplary embodiment of the present disclosure, a signaling field may include a PLP_ISSYI field (1 bit), a TTO field (32 bits), and a BUFS field (12 bits). That is, according to the present exemplary embodiment, a configuration field 23-1 and a dynamic field 23-2 are not distinguished. In this case, the TTO field and the BUFS field are not needed when the PLP_ISSYI is not activated and thus, due to this dependency, the TTO field and the BUFS field may be included in the signaling field only when the PLP_ISSYI field is 1.

As illustrated in FIG. 6C, according to another exemplary embodiment of the present disclosure, a configurable field 23-1 of a signaling field may include a PLP_ISSYI_mode field (2 bits) and a dynamic field 23-2 may include a TTO field (32 bits), a BUFS field (12 bits), an ISCR Interval field (10 bits), and an ISCR_IF field (24 bits). Here, the ISCR Interval field has a specific value when the PLP_ISSYI_mode is 10. That is, the ISCR Interval field has a specific value when an ISCR value is transmitted as a portion of an L1 packet.

Here, the PLP_ISSYI_mode field (2 bits) may have values shown in Table 7 below.

TABLE 7

| | |
|---|---|
| 00 | ISSY is not used. |
| 01 | the ISCR value is carried as part of each L1 packet (header) |
| 10 | the ISCR value is carried as part of particular L1 packet (header) |
| 11 | the ISCR value is appended to each user packet (or reserved) |

The dynamic field 23-2 illustrated in FIG. 6C may have the same value for all transmission frames to which the interleaving frame 470 is mapped, and the TTO field and the BUFS field may be always present and used as reserve regions.

In detail, TTO directly signals a TTO value of a first user packet started in a data field of a first L1 packet of an interleaving frame 470.

BUFS indicates a buffer size of a receiver assumed by a modulator with respect to PLP. ISCR_Interval indicates the number of L1 packets between two L1 packets for transmitting an ISCR value. When the corresponding value is set to 0, whether the ISCR value is transmitted may be indicated in a header of an L1 packet. When 0<ISCR_Interval<1023$_D$, the first L1 packet of the interleaving frame 470 carries the ISCR value. The corresponding field has a specific value only when PLP_ISSYI_mode is '10'.

ISCR_IF transmits the ISCR value of a first user packet started in a data field of a first L1 packet of the interleaving frame 470. The corresponding field may have a specific value only when the ISCR_Interval is 1023$_D$. In addition, when ISCR_Interval>0, the corresponding field may be omitted when the first L1 packet of the interleaving frame 470 transmits the ISCR value.

As illustrated in FIG. 6D, according to another exemplary embodiment of the present disclosure, a configurable field 23-1 of a signaling field may include a PLP_ISSYI_mode field (1 bit) and a dynamic field 23-2 of the signaling field may include a TTO field (32 bits), a BUFS field (12 bits), and an ISCR Interval field (10 bits). Here, the TTO field, the BUFS field, and the ISCR Interval field may have specific values only when PLP_ISSYI is activated, that is, when the PLP_ISSYI_mode is 1.

Here, the PLP_ISSYI_mode field (1 bit) may have values shown in Table 8 below.

TABLE 8

| | |
|---|---|
| 0 | ISSY is not used. |
| 1 | the ISCR value is carried as part of L1 packet (header) |

The dynamic field 23-2 illustrated in FIG. 6D may have the same value for all transmission frames to which the interleaving frame 470 is mapped.

As illustrated in FIG. 6E, according to another exemplary embodiment of the present disclosure, a configuration field of a signaling field may include a PLP_ISSYI_mode field (1 bit) and a dynamic field 23-2 of the signaling field may include a TTO field (32 bits), a BUFS fields (12 bits), and an ISCR Interval field (10 bits).

Here, when PLP_ISSYI_mode is 0, the TTO field, the BUFS field, and the ISCR Interval field may be set to "0" or used as a reserve region.

In addition, when PLP_ISSYI_mode is 1, a first L1 packet of an interleaving frame 470 may transmit an ISCR value.

Here, the PLP_ISSYI_mode field (1 bit) may have values shown in Table 9 below.

TABLE 9

| | |
|---|---|
| 0 | ISSY is not used. |
| 1 | the ISCR value is carried as part of L1 packet (header) |

ISCR_Interval indicates an interval between L1 packets for transmitting an ISCR value and transmits the ISCR value of a first L1 packet to the interleaving frame 470. When the corresponding value is set to 0, a value indicating whether the ISCR value is transmitted is included in a header of an L1 packet. In addition, when the corresponding value is set to '$1023_B$', only a first L1 packet of the interleaving frame 470 transmits the ISCR value.

As illustrated in FIG. 6F, according to another exemplary embodiment of the preset disclosure, a configurable field 23-1 of a signaling field may include a PLP_ISSYI_mode field (2 bits) and a dynamic field 23-2 of the signaling field may include a TTO field (32 bits), a BUFS field (12 bits), and an ISCR Interval field (10 bits).

Here, the PLP_ISSYI_mode field (2 bits) may have values shown in Table 10 below.

TABLE 10

| | |
|---|---|
| 00 | ISSY is not used. |
| 01 | reserved |
| 10 | the ISCR value is carried as part of L1 packet (header) |
| 11 | the ISCR value is appended to each user packet |

In this case, when PLP_ISSYI_mode is '00' or '01', TTO and BUFS fields may be set to '0' or used as a reserve region.

In addition, when the PLP_ISSYI_mode is not '10', an ISCR Interval field may be set to '0' or used as a reserve region.

When the ISCR_Interval is set to '0', whether an ISCR value is transmitted may be indicated by a header of an L1 packet. Otherwise, a first L1 packet of an interleaving frame 470 may transmit the ISCR value.

Figure 7:
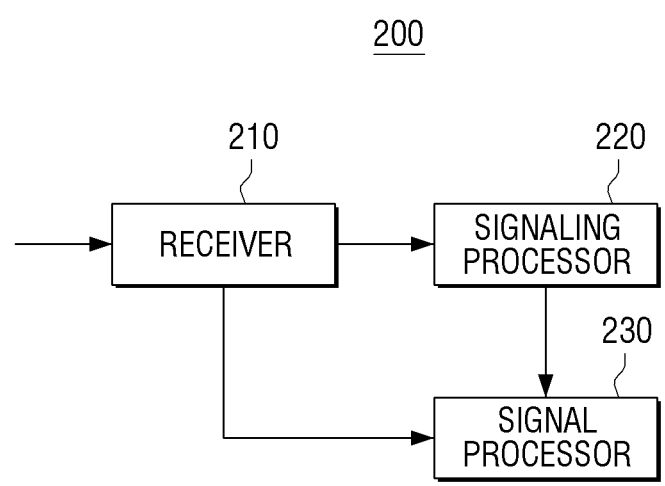
FIG. 7 is a block diagram illustrating a structure of a receiving apparatus according to an exemplary embodiment of the present disclosure.

FIG. 7 is a block diagram illustrating a structure of a receiving apparatus 200 according to an exemplary embodiment of the present disclosure.

Referring to FIG. 7, the receiving apparatus 200 includes a receiver 210, a signaling processor 220, and a signal processor 230.

The receiver 210 receives a frame including signaling information and data mapped to at least one signal processing path. Here, the signaling information may include ISSY mode information, receiver BUFS required according to the ISSY mode information, and time information (TTO) between the P1 symbol of a preset frame for transmitting a user packet and time when a preset bit of a first user packet of a user packet is output.

The signaling processor 220 extracts signaling information from the received frame. In particular, the signaling processor 220 may extract and decode L1 signaling to acquire ISSY mode information, and BUFS and TTO values. To this end, the signaling processor 220 may detect and decode a P1 symbol including the L1 signaling.

In addition, as necessary, the signaling processor 220 may extract and decode the L1 signaling to acquire an ISCR value. However, as necessary, the ISCR value may be acquired via the signal processor 230 according to a location where the ISCR is contained.

The signal processor 230 may signal-process data included in the frame based on the extracted signaling information.

The signal processor 230 may signal-process the received frame using the ISSY mode, BUFS, and TTO values acquired from the signaling processor 220. For example, the signal processing may be performed via demodulation, a frame de-builder, BICM decoding, and input de-processing.

In particular, the signal processor 230 may extract and FEC decode PLP and generate an L2 packet from an L1 packet with corrected errors based on the ISSY mode, BUFS, TTO, and ISCR values provided from the signaling processor 220.

Figure 8:
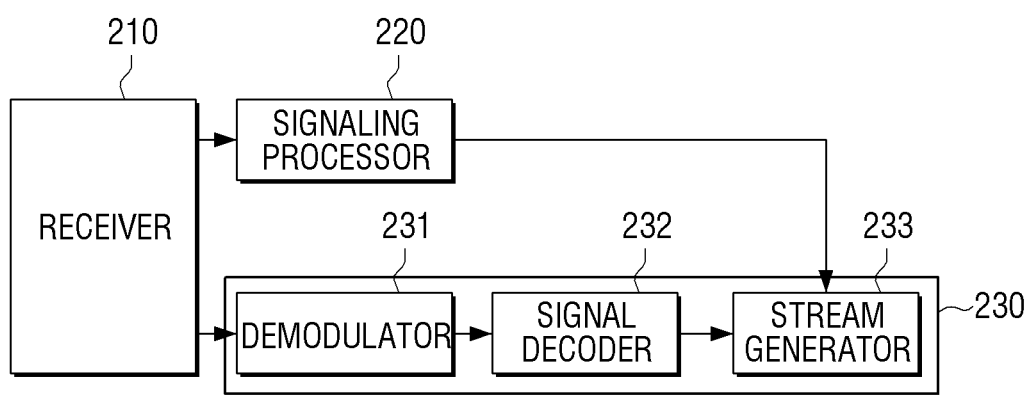
FIG. 8 is a block diagram for detailed explanation of a signal processor according to an exemplary embodiment of the present disclosure.

FIG. 8 is a block diagram for detailed explanation of the signal processor 230 according to an exemplary embodiment of the present disclosure.

Referring to FIG. 8, the signal processor 230 includes a demodulator 231, a signal decoder 232, and a stream generator 233.

The demodulator 231 demodulates a received RF signal according to an Orthogonal Frequency-Division Multiplexing (OFDM) parameter and performs synch detection. When synch is detected, the demodulator 231 recognizes whether the received frame is a mobile frame or a fixed frame based on stored in a synch region.

When an OFDM parameter about a signaling region and a data region is not determined, the demodulator 231 may acquire an OFDM parameter about a signaling region and a data region that is stored in the synch region and acquire an OFDM parameter about a signaling region and a data region immediately subsequent to the synch region in order to demodulate the received RF signal.

The signal decoder 232 decodes input data. In this case, the signal decoder 232 may acquire parameters of an FEC scheme, a modulation scheme, and so on, regarding each data region, and perform decoding. In addition, the signal decoder 232 may calculate a start position of data based on data information included in a configurable field 23-1 and a dynamic field 23-2. That is, the signal decoder 232 may calculate a location from which the corresponding PLP is transmitted.

The stream generator 233 may process a BaseBand (BB) frame input from the signal decoder 232 to generate service target data.

The stream generator 233 may generate an L2 packet from an L1 packet with corrected errors, based on ISSY mode information, and BUFS, TTO, and ISCR values provided from the signaling processor 220.

In detail, the stream generator 233 may include de-jitter buffers that may regenerate accurate timing for restoring an output stream based on the ISSY mode information, and BUFS, TTO, and ISCR values provided from the signaling processor 220, thereby compensating for a synch delay between a plurality of PLPs.

Figure 9:
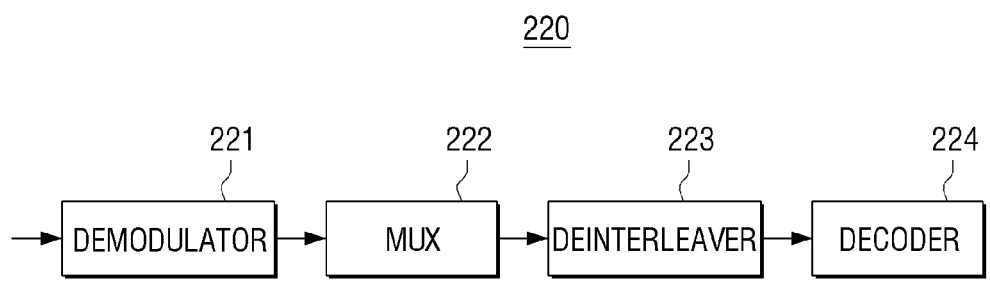
FIG. 9 is a block diagram illustrating a structure of a signaling processor according to an exemplary embodiment of the present disclosure.

FIG. 9 is a block diagram illustrating a structure of the signaling processor 220 according to an exemplary embodiment of the present disclosure.

Referring to FIG. 9, the signaling processor 220 includes a demodulator 221, a mux 222, a deinterleaver 223, and a decoder 224.

The demodulator 221 demodulates a signal transmitted from the transmitting apparatus 100. In detail, the demodulator 221 demodulates the signal to generate a value corresponding to Low-Density Parity-Check (LDPC) codeword and outputs the LDPC codeword to the mux 222.

In this case, the value corresponding to the LDPC codeword may be represented using a channel value about the signal. Here, the channel value may be determined using values methods. An example of the methods may include a method of determining a log likelihood ratio (LLR) value.

Here, the LLR value may be represented by applying Log to a ratio of a probability that a bit transmitted from the transmitting apparatus 100 is 0 and a probability that the bit is 1. The LLR value may be a bit value determined according to hard decision. Alternatively, the LLR value may be a representative value determined according to a range to which a probability that the bit transmitted from the transmitting apparatus 100 is 0 or 1.

The mux 222 multiplexes an output value of the demodulator 221 and outputs the multiplexed value to the deinterleaver 223. Here, the output value of the demodulator 221 may be a value corresponding to the LDPC codeword, for example, an LLR value.

In detail, the mux 222 may correspond to a component corresponding to the demux 1240-2 (refer to FIG. 3) included in the transmitting apparatus 100 and perform a reverse process of a demultiplexing process performed by the demux 1240-2. That is, the mux 222 parallel-to-serial converts the value corresponding to the LDPC codeword output from the demodulator 221 and multiplexes the value corresponding to the LDPC codeword.

The deinterleaver 223 deinterleaves the output value of the mux 222 and outputs the deinterleaved value to the decoder 224.

In detail, the deinterleaver 223 may be a component corresponding to the bit interleaver 1230-2 (refer to FIG. 3) included in the transmitting apparatus 100 and may perform a reverse process of an operation performed by the bit interleaver 1230-2 (refer to FIG. 3). That is, the deinterleaver 223 may deinterleave the value corresponding to the LDPC codeword so as to correspond to the interleaving operation performed by the bit interleaver 1230-2 (refer to FIG. 3). Here, the value corresponding to the LDPC codeword may be, for example, an LLR value.

The decoder 224 may be a component corresponding to the FEC encoder 1220-2 included in the transmitting apparatus 100 and may perform a reverse operation of an operation performed by the FEC encoder 1220-2. In detail, the decoder 224 may perform decoding based on the deinterleaved LLR value to output L1 signaling.

Figure 10:
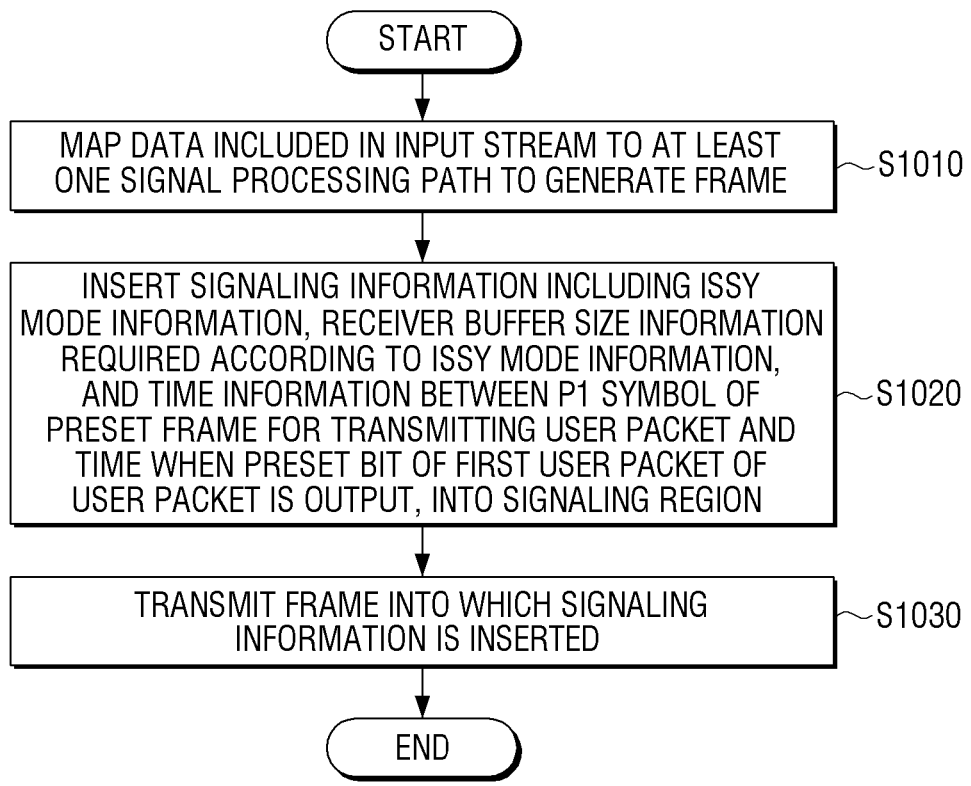
FIG. 10 is a flowchart for explanation of a signaling processing method of a transmitting apparatus according to an exemplary embodiment of the present disclosure.

FIG. 10 is a flowchart for explanation of a signaling processing method of a transmitting apparatus according to an exemplary embodiment of the present disclosure.

According to the signaling processing method of the transmitting apparatus of FIG. 10, first, data included in an input stream is mapped to at least one signal processing path in order to generate a frame (S1010).

Then, signaling information is inserted into a signaling region of the frame (S1020). Here, the signaling information may include ISSY mode information, receiver BUFS required according to the ISSY mode information, and time-to-output information (TTO) between the P1 symbol of a preset frame for transmitting a user packet and time when a preset bit of a first user packet of a user packet is output. Here, a preset frame may be a first frame to which an interleaving frame 470 for transmitting a user packet is mapped.

Then, the frame into which the signaling information is inserted is transmitted (S1030).

In addition, the signaling region of the frame into which the signaling information is inserted may include a configurable field 23-1 and a dynamic field 23-2. In this case, the ISSY mode information may be included in the configurable field 23-1, and the receiver BUFS and the TTO information may be included in the dynamic field 23-2.

In addition, the dynamic field 23-2 may further include ISCR information.

In addition, the signaling information may include pre-signaling and post-signaling information, and the configurable field 23-1 and the dynamic field 23-2 may be included in the post-signaling information.

Figure 11:
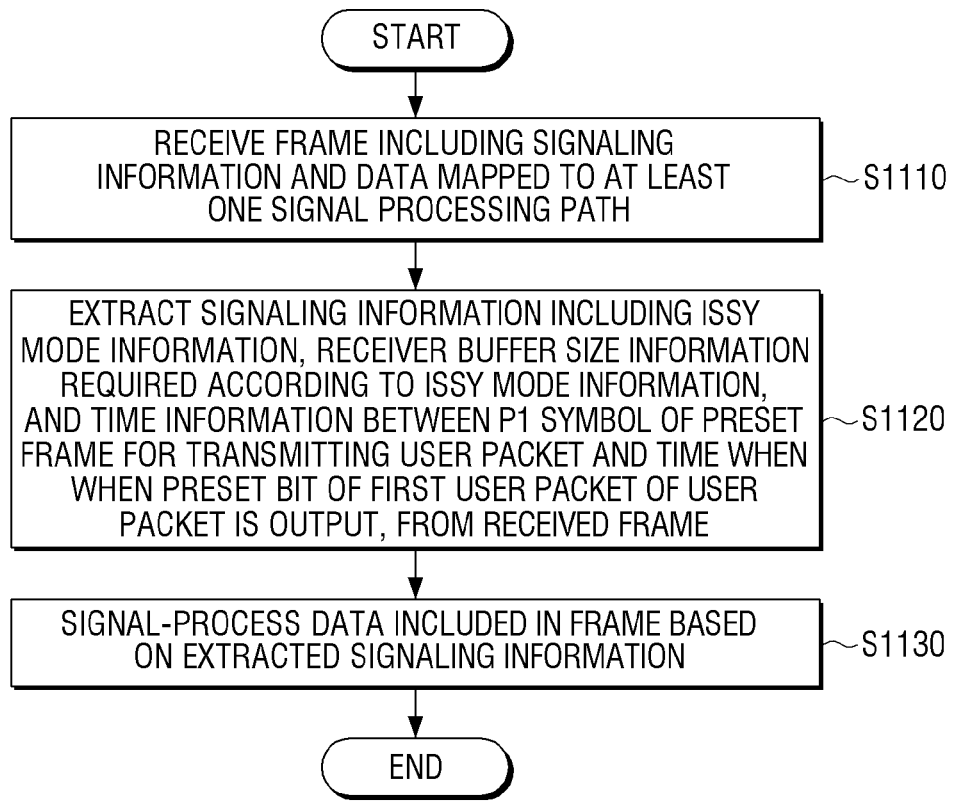
FIG. 11 is a flowchart of a signal processing method of a receiving apparatus according to an exemplary embodiment of the present disclosure.

FIG. 11 is a flowchart of a signal processing method of a receiving apparatus according to an exemplary embodiment of the present disclosure.

According to the signaling processing method of the receiving apparatus of FIG. 11, first, a frame including signaling information and data mapped to at least one signal processing path is received (S1110).

Then, the signaling information is extracted from the received frame (S1120).

Then, the data included in the frame is signal-processed based on the extracted signaling information (S1130). In this case, the data is signal-processed based on ISSY mode information, receiver BUFS information required according to the ISSY mode information, and TTO information, which are included in the signaling information.

In addition, the signaling region of the frame into which the signaling information is inserted may include a configurable field 23-1 and a dynamic field 23-2. In this case, the ISSY mode information may be included in the configurable field 23-1, and the receiver BUFS and the time information (TTO) between the P1 symbol of a preset frame for transmitting a user packet and time when a preset bit of a first user packet of a user packet is output may be included in the dynamic field 23-2.

In addition, the dynamic field 23-2 may further include ISCR information.

In addition, the signaling information may include pre-signaling and post-signaling information, and the configurable field 23-1 and the dynamic field 23-2 may be included in the post-signaling information.

FIGS. 12A to 12F are diagrams illustrating a case in which an ISSY field 441-4 is present in an L2 packet, according to another exemplary embodiment of the present disclosure.

Figure 12A:
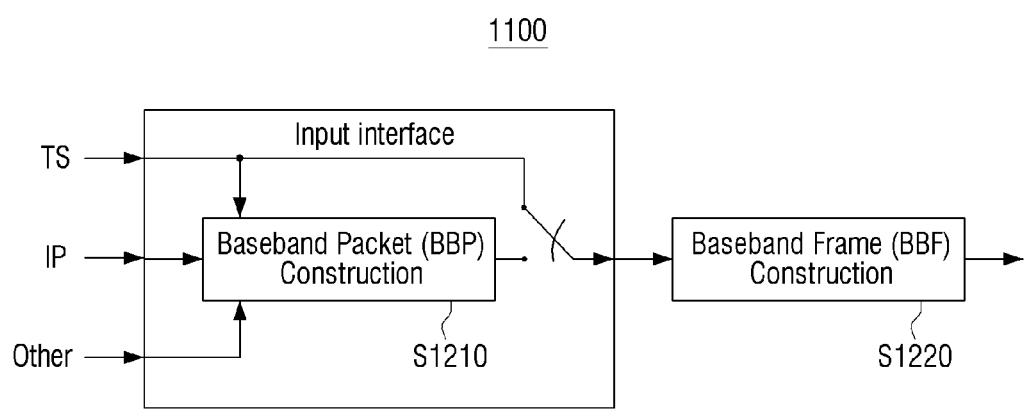

FIG. 12A is a diagram illustrating another exemplary embodiment of the input processor 1100. Referring to FIG. 12A, the input processor 1100 includes a BaseBand Packet (BBP) generator S1210 and a BaseBand Frame (BBF) generator S1220. The BBP corresponds to an L2 packet according to the aforementioned exemplary embodiment and the BBF corresponds to an L1 packet according to the aforementioned exemplary embodiment. The BBP generator S1210 generates the BBP using TS, IP, or other types of streams as input. In this case, the TS stream may not be converted into a type of BBP and may be output in its original form. In this case, it is noted that a TS packet included in the TS stream corresponds to an L2 packet according to the aforementioned exemplary embodiment. The BBF generator S1220 generates the BBF using the BBPs as input.

Figure 12B:
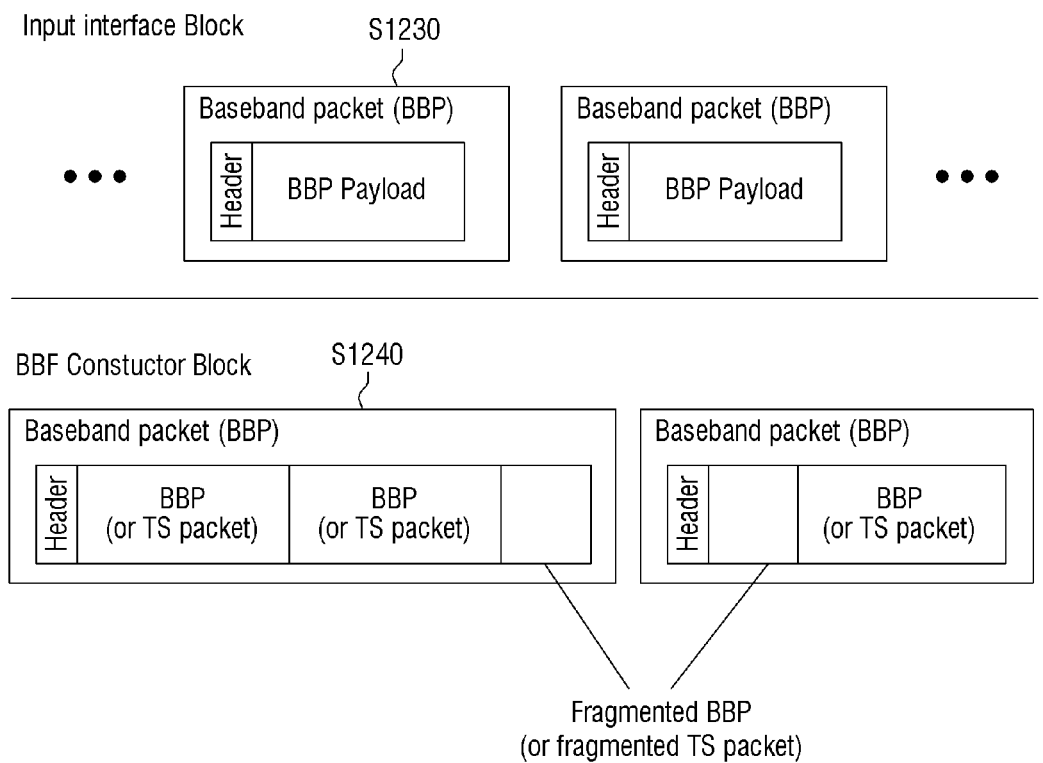

FIG. 12B is a diagram illustrating a relationship between BBP S1230 and BBF S1240. Referring to FIG. 12B, a BBP Payload of the BBP S1230 is a packet included in the TS, IP, or other types of streams. In addition, it is noted that the BBF S1240 may include a plurality of complete BBPs or portions thereof.

Figure 12C:
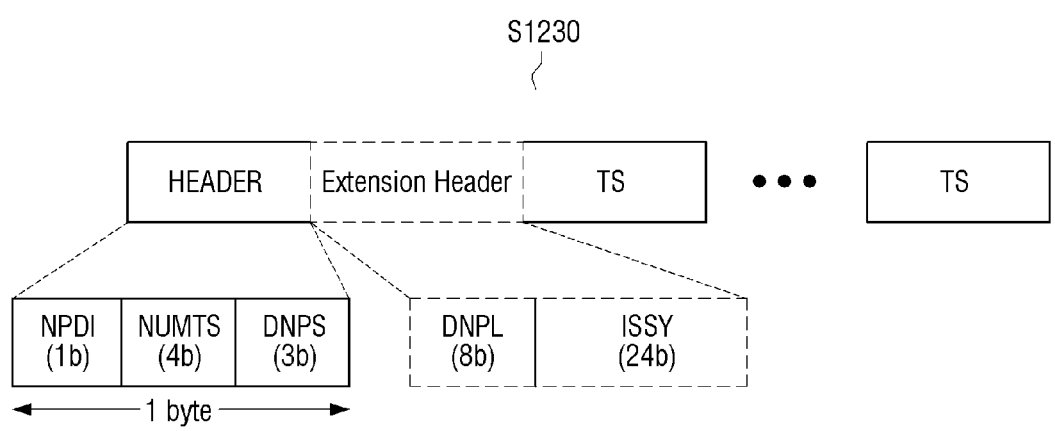

FIG. 12C is a diagram illustrating an example of a format of the BBP S1230 when an input stream of the corresponding PLP is a TS stream.

Figure 12D:
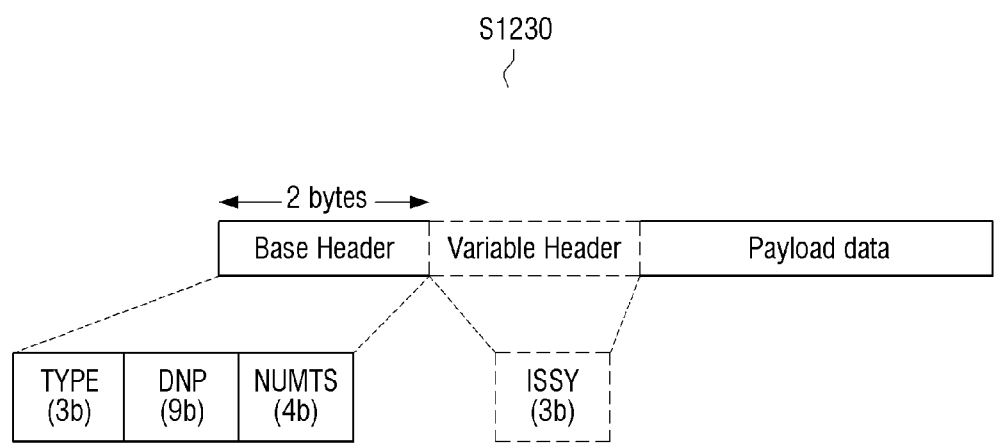

FIG. 12D is a diagram illustrating an example of a format of the BBP S1230 including a TS packet included in the TS stream when an input stream of the corresponding PLP includes a TS stream and includes IP or other types of streams except for the TS stream.

In FIGS. 12C and 12D, an ISSY field 441-4 may be included in an Extension/Variable header of BBP. In addition, an ISCR value indicating a counter value of a point of time when a first TS packet included in the BBP S1230 is input to the BBP generator S1210 may be transmitted to the ISSY field 441-4. The counter operates at a frequency that is known to a transmitter and a receiver. The ISSY field 441-4 may be included in only a first BBP S1230 started in the BBF S1240, among one or more BBP S1230 included in the BBF S1240.

FIG. 12E is a diagram for explanation of a configuration of a signaling field according to the exemplary embodiment illustrated in FIGS. 12A to 12D. PLP_ISSY_IND of configurable L1-post of FIG. 12E is a field signaling whether ISSY is applied to corresponding PLP. PLP_BUFS of dynamic L1-post of FIG. 12E indicates a maximum buffer size requested for the corresponding PLP, and PLP_TTO indicates time information between a preamble of a first frame included in an interleaving frame 470 including a frame to which the signaling fields are transmitted and time when a first TS packet of a first complete BBP included a first BBF of the interleaving frame 470 to be output. The PLP_TTO is calculated as a multiple of a counter value that is set in order to determine the ISCR.

In the aforementioned exemplary embodiment, PLP_TTO, and PLP_BUFS fields are present in dynamic L1-post and the ISSY field 441-4 of the BBP S1230 only when the PLP_ISSY_IND of the corresponding PLP is set to '1'. However, in some exemplary embodiments, needless to say, although these fields are present, values of the fields may be processed to be reserved.

FIG. 12F is another exemplary embodiment for explanation of the configuration of a signaling field according to the exemplary embodiment illustrated in FIGS. 12A to 12D. FIG. 12F is the same as FIG. 12E except that a maximum buffer size requested for corresponding PLP is signaled by two fields of PLP_BUFS_UNIT and PLP_BUFS. The PLP_BUFS_UNIT field is a field signaling a unit of the PLP_BUFS and is defined as shown in Table 11 below. Thus, in the exemplary embodiment illustrated in FIG. 12F, the maximum buffer size requested for the corresponding PLP is calculated as a value obtained by multiplying a number indicated by the PLP_BUFS field and the unit signaled by the PLP_BUFS_UNIT.

TABLE 11

| | |
|---|---|
| 00 | 1 Kbits |
| 01 | 8 Kbits |
| 10 | 64 Kbits |
| 11 | 1 Mbits |

Figure 13:
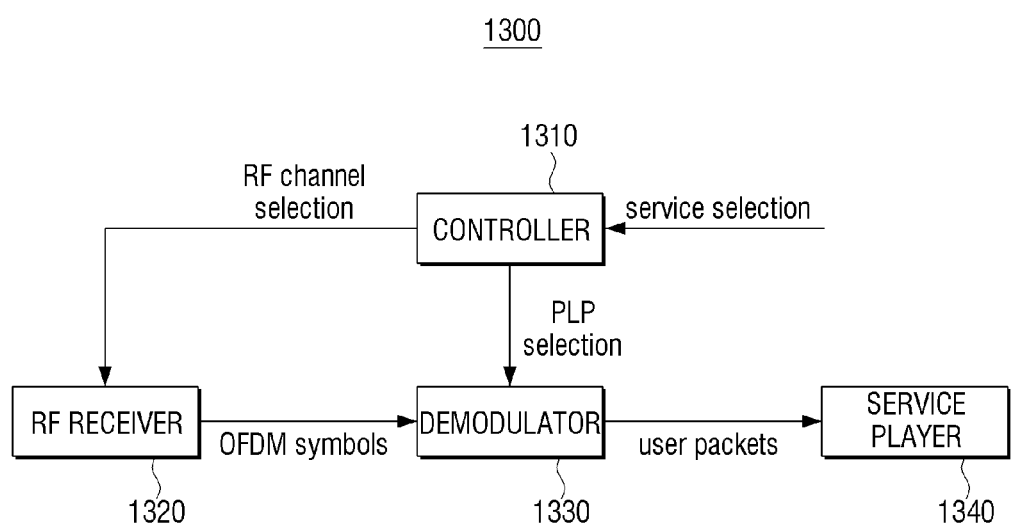
FIG. 13 is a block diagram illustrating the configuration of a receiver according to an exemplary embodiment of the present disclosure.

FIG. 13 is a block diagram illustrating the configuration of a receiver according to an exemplary embodiment of the present disclosure.

Referring to FIG. 13, the receiver may be configured including a controller 1310, an RF receiver 1320, a demodulator 1330, and a service player 1340. The controller 1310 determines the RF channel and PLP through which the selected service is transmitted. In this case, the RF channel may be limited to center frequency and bandwidth, and PLP may be limited to PLP ID. A specific service may be transmitted through at least one PLP which belongs to at least one RF channel by components which consist of the specific service, but hereinbelow it will be assumed that all the data required to play one service are transmitted to one PLP which is transmitted via one RF channel, for convenience of explanations. That is, a service has an exclusive path to obtain data, and the obtained data path is limited to RF channel and PLP.

The RF receiver 1320 detects an RF signal from the RF channel selected by the controller 1310, and transmits to the demodulator 1330 OFDM symbols which are extracted by performing signal processing for the RF signal. Signal processing may include synchronization, channel estimation, equalization, or the like, and information for signal processing may be a pre-agreed value by the transmitter/receiver according to use and implementation, or may be included in specific OFDM symbol which is pre-agreed from among OFDM symbols, and is transmitted from the receiver.

The demodulator 1330 extracts a user packet by performing signal processing for OFDM symbols and transmits the user packet to the service player 1340, and the service player 1340 plays and outputs the service selected by a user by using the user packet. In this case, format of the user packet may be different according to a method for implementing a service. For example, there is a TS packet or IPv4 packet.

Figure 14:
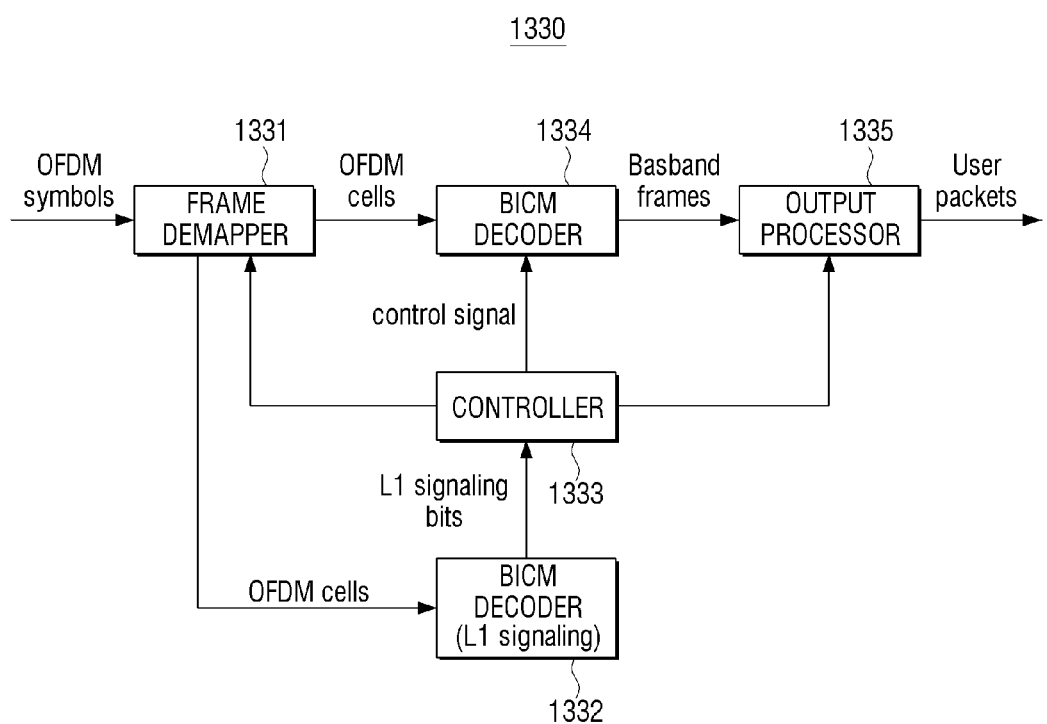
FIG. 14 is a block diagram further illustrating the demodulator 1330 of FIG. 13 according to an exemplary embodiment of the present disclosure.

FIG. 14 is a block diagram further illustrating the demodulator 1330 of FIG. 13 according to an exemplary embodiment of the present disclosure.

Referring to FIG. 14, the demodulator 1330 may be configured including a frame demapper 1331, a BICM decoder 1332 for L1 signaling, a controller 1333, a BICM decoder 1334, and an output processor 1335.

The frame demapper 1331, based on control information transmitted from the controller 1333, selects ODFM cells which constitute FEC blocks belonging to PLP selected at a frame which constitutes of OFDM symbols, transmits the cells to the BICM demodulator 1334, selects OFDM cells which correspond to at least one FEC block including L1 signaling, and transmits the cells to the BICM decoder 1332 for L1 signaling. The BICM decoder 1332 for L1 signaling extracts L1 signaling bits by performing signal processing for OFDM cells which correspond to FEC block including L1 signaling, and transmit L1 signaling bits to the controller 1333. In this case, signal processing may include a process of extracting LLR (long-likelihood ratio) value for LDPC decoding at OFDM cells and a process of decoding LDPC signals by using the extracted LLR value.

The controller 1333 controls operations of the frame demapper 1331, the BICM decoder 1334, and output processor 1335 by extracting L1 signaling table from L1 signaling bits and using L1 signaling table value. FIG. 14 illustrates, for easier explanation, that the BICM decoder 1332 for L1 signaling does not use control information of the controller 1333. However, when L1 signaling has the hierarchy structure similar to the aforementioned L1-PRE and L1-POST structures, it is apparent that the BICM decoder 1332 for L1 signaling may constitute of at least one BICM decoding blocks, and the operations of the BICM decoding blocks and the frame demapper 1331 may be controlled by the upper level L1 signaling information.

The BICM decoder 1334 extracts baseband frames by performing signal processing for OFDM cells which constitute FEC blocks belonging to the selected PLP, and transmits the baseband frames to the output processor 1335. Herein, the signal processing may include the process of extracting LLR (log-likelihood ratio) for decoding LDPC signal at OFDM cell and the process of decoding LDPC code by using the extracted LLR value, and these processes may be performed based on control information transmitted from the controller 1333.

The output processor 1335 extracts a user packet by performing signal processing for baseband frames and transmits the extracted user packet to the service player 1340. The signal processing may be performed based on control information transmitted by the controller 1333.

According to an exemplary embodiment, L1 signaling may include ISSY mode information, information on buffer size of the receiver according to ISSY mode information, and information on output time of the first user packet of the corresponding PLP included in the frame. In this case, information is included in control information transmitted by the controller 1333 to the output processor 1335. The output processor 1335 stores a user packet in a buffer based on control information and transmits the user packet to the service player in a predetermined time.

Figure 15:
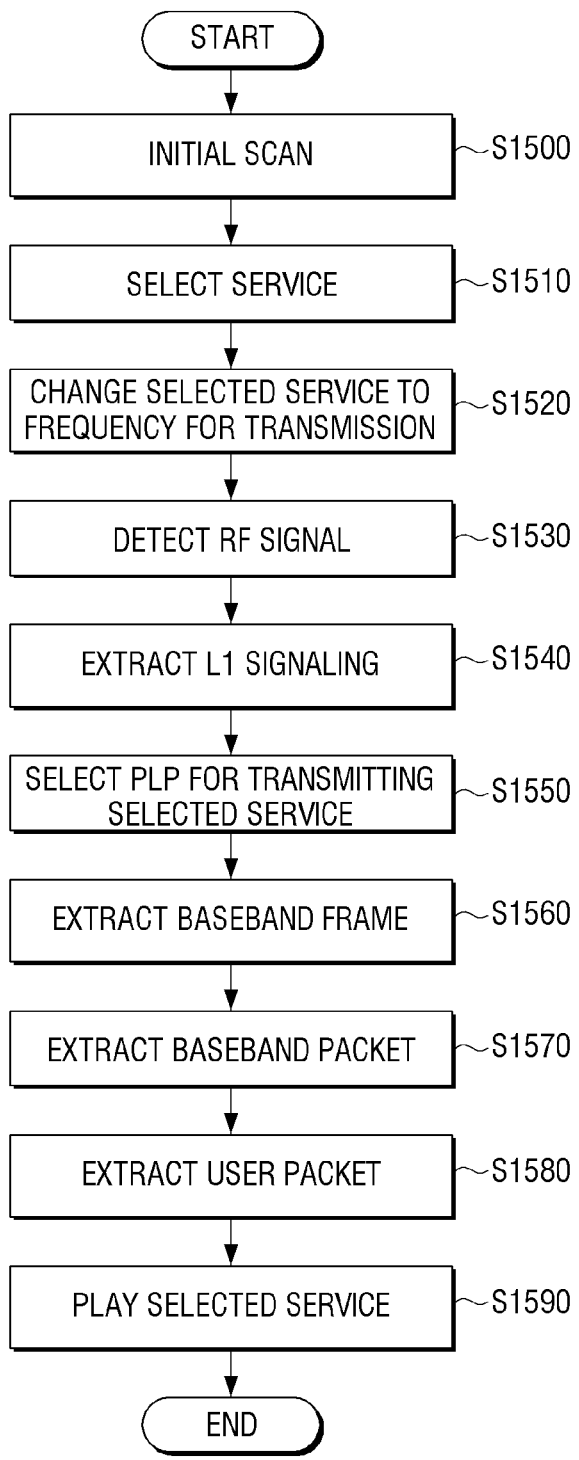
FIG. 15 is a flow chart which briefly illustrates the operations of the receiver from the time when a user selects a service to the time when the actually selected service is played.

FIG. 15 is a flow chart which briefly illustrates the operations of the receiver from the time when a user selects a service to the time when the actually selected service is played.

It is assumed that service information on all the services selectable at the stage of initial scanning (S1500) is obtained before selecting a service by a user (S1510). The service information may include information on the RF channel and PLP from which data is delivered to play a specific service in the present broadcasting system. PSI/SI (Program-Specific Information/Service Information) of MPEG2-TS is an example of service information, which is generally obtainable from L2 signaling and signaling of an upper level.

When a user selects a service (S1510), the receiver changes the selected service (S1520) to frequency for transmitting the service, and performs detecting of the RF signal (S1530). In the process where changing (S1520) the selected service to the frequency for transmission, service information may be used.

When the RF signal is extracted, the receiver performs the operations of extracting signaling (S1540) from the detected RF signal. Then, the receiver selects the PLP (S1550) for transmitting the selected service using the extracted L1 signaling, and extracts the baseband frame (S1560) from the selected PLP. In the process of selecting (S1550) the PLP for transmitting the selected service, service information may be used. Further, the process of extracting (S1560) of the baseband frame may include the process of demapping the transmission frame and selecting the OFDM cells belonging to the PLP, the process of extracting LLR (log-likelihood ratio) for decoding of OFDM cells, and decoding LDPC code by using the extracted LLR value.

The receiver performs extracting the baseband packet (S170) from the baseband frame extracted using header information of the extracted baseband frame, and then, performs extracting the user packet (S1580) from the baseband packet extracted using the baseband packet.

In this case, the extracted user packet is used for playing the selected service (S1590). The L1 signaling information obtained in the step of extracting L1 signaling (S1540) during the process of extracting the baseband packet (S1570) and the process of extracting the user packet (S1580) may be used.

According to an exemplary embodiment, L1 signaling may include ISSY mode information, information on buffer size of a receiver which is required according to ISSY mode information, and information on output time of the first user packet of the corresponding PLP included in the frame, and in this case, information may be used for buffer control in the process of extracting the user packet (S1580). More specifically, L1 signaling may be used for control of size of buffer to store the extracted user packet and output time of the user packet to a service player.

In the above-described exemplary embodiments, it is assumed that the user packet is MPEG-2 TS packet, but the invention is not limited thereto. In addition, the user packet needs to be understood as a general term which indicates a formatted block of data, which includes IP packet.

As described above, according to the various exemplary embodiments of the present disclosure, information for compensating for variable delay caused via data processing at a transmitter may be acquired from signaling information, thereby improving stream processing performance of a receiver.

A non-transitory computer readable medium for recording thereon a program for sequentially performing the signal processing method according to the exemplary embodiments of the present disclosure may be provided.

The non-transitory computer readable medium is a medium from which data is readable by a device. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

Although the above block diagrams illustrating the transmitting apparatus and the receiving apparatus do not illustrate a bus, components of the transmitting apparatus and the receiving apparatus may communicate with each other via the bus. In addition, each apparatus may further include a processor such as a center processing unit (CPU), a microprocessor, and so on, for performing the aforementioned operations.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A transmitting apparatus comprising:
a frame generator configured to generate a frame;
an inserter configured to insert signaling to the frame; and
a transmitter configured to transmit the frame comprising the signaling,
wherein the signaling comprises input stream synchronizer (ISSY) mode information,
wherein the ISSY mode information comprises a first value or a second value,
wherein the signaling comprises a first type of signaling and a second type of signaling,
wherein the first value indicates that Input Stream Clock Reference (ISCR) information is included in the first type of signaling, and
wherein the second value indicates that the ISCR information is included in the second type of signaling.

2. The transmitting apparatus as claimed in claim 1, wherein the signaling further comprises time information representing a time between a P1 symbol of a predetermined frame and an output of a predetermined bit of a first packet of at least one packet included in the predetermined frame.

3. The transmitting apparatus as claimed in claim 2, wherein:
the signaling comprises a configurable field and a dynamic field;
the configurable field comprises the ISSY mode information; and
the dynamic field comprises a receiver buffer size information according to the ISSY mode information and the ISCR information.

4. The transmitting apparatus as claimed in claim 2, wherein the predetermined frame is a first frame to which an interleaving frame for carrying the packet is mapped, and the predetermined bit is a most significant bit (MSB).

5. The transmitting apparatus as claimed in claim 1, wherein the ISSY mode information comprises a third value, and
wherein the third value indicates that an ISSY is not used.

6. A digital video broadcasting second generation terrestrial (DVB-T2) transmitting system, including the transmitting apparatus as claimed in claim 1, wherein:
the signaling is a region for transmitting L1 signaling.

7. A digital video broadcasting second generation terrestrial (DVB-T2) transmitting system, including the transmitting apparatus as claimed in claim 2, wherein:
a receiver buffer size is a buffer size (BUFS) and the time information is time to output (TTO).

8. A signal processing method of a transmitting apparatus, the method comprising:
generating a frame;
inserting signaling to the frame; and
transmitting the frame comprising the signaling,
wherein the signaling comprises input stream synchronizer (ISSY) mode information,
wherein the ISSY mode information comprises a first value or a second value, wherein the signaling comprises a first type of signaling and a second type of signaling,
wherein the first value indicates that Input Stream Clock Reference (ISCR) information is included in the first type of signaling, and
wherein the second value indicates that the ISCR information is included in the second type of signaling.

9. The method as claimed in claim 8, wherein: the signaling further comprises time information representing a time between a P1 symbol of a predetermined frame and an output of a predetermined bit of a first packet of at least one packet included in predetermined frame.

10. The method as claimed in claim 9, wherein:
the signaling comprises a configurable field and a dynamic field;
the configurable field comprises the ISSY mode information; and
the dynamic field comprises a receiver buffer size information and the time information according to the ISSY mode information and the ISCR information.

11. The method as claimed in claim 8,
wherein the ISSY mode information comprises a third value, and wherein the third value indicates that an ISSY is not used.

* * * * *